United States Patent [19]

Rood

[11] 4,139,160

[45] Feb. 13, 1979

[54] SPRAY NOZZLE HAVING AN IMPROVED SEAL

[75] Inventor: Alvin A. Rood, Oberlin, Ohio

[73] Assignee: Nordson Corporation, Amherst, Ohio

[21] Appl. No.: 799,037

[22] Filed: May 20, 1977

[51] Int. Cl.$^2$ .......................... B05B 15/00; F16L 19/00

[52] U.S. Cl. .......................................... 239/600; 285/321; 285/382.7; 403/372

[58] Field of Search .......................... 239/599, 600, 602; 285/319, 321, 382, 382.7, 386, DIG. 22; 29/526. R; 403/365, 371, 372

[56] References Cited

U.S. PATENT DOCUMENTS

| | | | |
|---|---|---|---|
| 2,950,937 | 8/1960 | Bedford, Jr. | 403/372 |
| 3,510,065 | 5/1970 | Gigantino et al. | 239/602 X |
| 3,532,367 | 10/1970 | Roos | 285/321 X |
| 3,556,411 | 1/1971 | Nord et al. | 239/599 X |

*Primary Examiner*—Robert W. Saifer
*Assistant Examiner*—Andres Kashnikow
*Attorney, Agent, or Firm*—George J. Coghill

[57] ABSTRACT

A nozzle tip with a cylindrical body is held in a nozzle tip holder by means of a thin walled tapered bushing. The nozzle tip is pressed into mechanically sealing engagement with the inside surface of the smaller end of the bushing, the bushing in turn being press-fit into mechanically sealing engagement with a cylindrical passage in a nozzle tip holding member.

8 Claims, 4 Drawing Figures

SPRAY NOZZLE HAVING AN IMPROVED SEAL

BACKGROUND OF THE INVENTION

1. Field of the Invention

This invention relates to liquid spray nozzles. Although this invention can be used in many different types of spraying systems, it has special application in systems utilizing ceramic nozzle tips.

2. Description of the Prior Art

Spraying nozzles are generally used to atomize liquids. Various kinds of spray nozzles have been known for a considerable time. For example, an airless type spray nozzle can be formed from a nozzle tip hydraulically connected to a source of pressurized liquid. The nozzle tip has a passage through it. An inlet end of the passage is supplied with liquid under pressure. The shape of the passage gives rise to forces and flow within the liquid stream causing turbulence and high velocity. This causes the liquid stream to be broken up into a multitude of small droplets in a special pattern upon discharge from the tip. The high velocity is caused by a restricted orifice in the nozzle tip passage at the discharge or outlet end of the nozzle tip. It should be noted here that the functional mechanics of the nozzle tip are generally described here only as a matter of background, and form no part of the invention. Reference can be made to U.S. Pat. No. 3,556,411 for a more detailed description.

Because of the high velocity caused by the restricted orifice, a nozzle tip is subject to abrasive wear at this point. Therefore it is desirable to form the nozzle tip from an abrasion resistant material. However, because many abrasion resistant materials such as ceramic are brittle, it is desirable to connect the nozzle tip to the supply of pressurized liquid by means of a nozzle tip holder which can be made of less brittle material and which provides protection and support for the nozzle tip.

The nozzle tip holder in the past has taken various forms, and was, in a simple form, in the shape of a ring, or a disc with a hole or passage in the middle. The nozzle tip was either glued or brazed into this hole in the tip holder.

Brazing or gluing of the nozzle tip in the holder performs satisfactorily for a large number of applications. However, recently there have been applications in which brazing or gluing was not acceptable. For example, there are processes which require the nozzle tip to be in an environment of very high temperature. In such applications the glue or brazing would melt. However, in these applications it is still sometimes desirable to use a small ceramic nozzle tip supported by a holder which would give strength and protection to the tip without making the whole assembly brittle. In such a situation a completely mechanical joint between the tip and the holder would be desirable. However any such mechanical joint must not exert undue stresses on the brittle ceramic tip lest it would fracture.

Further, even in situations where high temperature is not a problem, a completely mechanical joint between the nozzle tip and the tip holder is desirable. One example would be in the can industry. Recently there have been numerous regulations governing contamination of the interior of cans which will be used for food. The completely mechanical joint for the nozzle tip in a system used to coat the inside surfaces of cans reduces the number of possible contaminants, specifically the glue or the brazing material.

SUMMARY OF THE INVENTION

The subject of the present invention is a nozzle made up of a nozzle tip supported and sealed mechanically in a nozzle tip holder. In one embodiment a nozzle tip having a cylindrical outward surface is centrally disposed in a hole of a nozzle tip holder by means of a one piece, unthreaded, resilient, tapered bushing of annular cross section. The nozzle tip is press-fit into a circumferentially continuous mating surface on the inside of the bushing at the smaller end. An outward circumferentially continuous surface at the larger end of the bushing is press-fit into a circumferentially continuous mating surface on the inside of the hole in the tip holder. The bushing is made of a strong and stiff but resilient material and has a thin wall. Because of the resiliency and the thin wall, the bushing can "give" slightly when the nozzle tip is press-fit into it. Further, when the bushing is press-fit into the nozzle holder the forces acting on the outer surface of the larger end of the bushing are not transmitted directly to the nozzle tip. The forces interact only indirectly through the intermediate portion of the bushing between the mating surfaces at each end. Part of this intermediate portion is displaced from the mating surfaces. Because of these aspects the stresses on the nozzle tip are low during assembly while the mating surfaces and the tension exerted by the bushing effect a hydraulic seal between the members after assembly.

The present invention provides a nozzle where the tip does not need gluing or brazing into the tip holder. The circumferentially continuous mating surfaces in press-fit engagement with the nozzle tip and tip holder provide both hydraulic sealing and support. However, the bushing can be used in conjunction with gluing or brazing to give the assembly added integrity.

The invention provides a nozzle which can be used in high temperature applications, but still provides the benefits of using a nozzle tip held in a protective supporting member. Further, this invention provides a nozzle construction wherein mechanical supporting joints can also form the sealing joints between the tip and the holder in such a way that a brittle tip is not subjected to undue stress.

It is a further object of this invention to provide a nozzle with the above advantages which yet is easily fabricated and assembled.

DESCRIPTION OF THE PREFERRED EMBODIMENT

Figure 1:
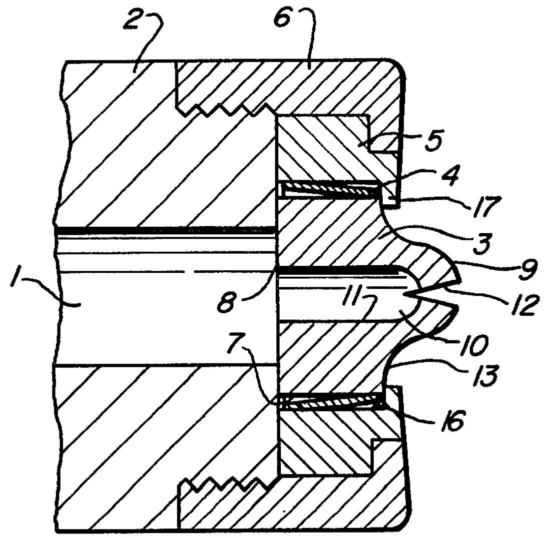
FIG. 1 shows a cross sectional view of a nozzle connected to a pressurizeable fluid conduit wherein a nozzle tip is held and sealed in a supportive holder by means of a tapered resilient bushing.

FIG. 1 shows the front end of a spraying system. A liquid under pressure is supplied to the passage 1 of a conduit 2 which could represent the end of a spray coating gun, an extension for a spray coating gun, or merely a tube attached to a source of pressurized liquid, etc. The pump and the upstream portion of the conduit 2 are not shown. A spray nozzle tip 3 is in sealed attachment to the conduit 2 by means of a bushing 4 which supports the nozzle tip 3 in a nozzle tip holder 5. The nozzle tip holder 5 in turn is sealably attached to the passage 1 in the conduit 2 by means of a retaining nut 6.

The nozzle tip 3 is typical of nozzle tips which are known in the art. This tip 3 has a generally cylindrical outer side surface 7, a flat rear surface 8, and a domed front surface 9. The nozzle tip 3 has a passage through it partially formed by a cavity 10. Part of a surface 11 of the cavity 10 intersects a slit 12 in the domed front surface 9 to complete the passage in the tip 3. The domed front surface 9 of the tip 3 slopes away from the center so that at its extremities it forms a surface 13 which is substantially parallel to the rear surface 8 of the nozzle tip 3, and forms a generally annular lip on the front surface 9 of the nozzle tip 3 surrounding the dome.

The nozzle tip 3 can be of ceramic material, or actually any other type of material suitable for forming nozzle tips. Materials selected for forming various kinds of nozzle tips for different situations are known in the art, and therefore will not be discussed here.

The nozzle tip 3 is held in a nozzle tip holder 5 by means of a bushing 4. The construction of the bushing 4 can be more readily appreciated by reference to FIG. 2. The bushing 4 is made of a strong and stiff but a resilient material and is generally thin walled. Stainless steel has been found to be a most acceptable material for the bushing.

The bushing 4 is of annular cross section, but is tapered from one end to the other. In the specific embodiment shown in FIG. 2, using stainless steel for the bushing 4, it has been found that a 3° slope (greatly exaggerated in the figure) of the outer and inner surfaces of the bushing with respect to the axis of the bushing 4 provides satisfactory results. There is a land 14 on the outer surface of the larger end of the bushing 4 and a land 15 on the inner surface of the smaller end of the bushing 4. These lands 14, 15 form generally cylindrical circumferentially continuous surfaces. The taper of the bushing facilitates the press-fitting steps of assembly, and enables the forces exerted at the lands 14, 15 to interract only indirectly through the intermediate portion of the bushing 4 which is displaced from and located between the lands 14, 15.

The bushing can be manufactured by standard machine turning processes well known in the art, and will not be discussed here.

The nozzle tip 3 is approximately 0.0020" larger in diameter than the diameter of the inside of the bushing 4 at the inside land 15. The nozzle tip 3 is press-fit into the bushing 4 so that the inside land 15 is in sealing compressive engagement with the cylindrical outer side surface 7 of the tip 3. Because the bushing 4 is thin walled and made of resilient material, when the nozzle tip 3 is press-fit into the bushing 4 the narrow end of the bushing expands slightly to allow the tip to enter without exerting a disproportionate amount of stress on the nozzle tip 3 which would cause the tip 3 to fracture. The inside land 15 of the bushing 4, and the outer side surface 7 of nozzle tip 3 are mating surfaces. The tension caused by the press-fit urges the surface of the inside land 15 against the outer surface 7 of the tip 3 and forms a hydraulic seal between these two surfaces.

The nozzle tip holder 5 has a passage or hole through it defined by a cylindrical inward surface 16. The cross sectional diameter of this cylindrical surface 16 is approximately 0.0020" less than the diameter of the outside of the bushing at the outside land 14. After the tip is in the bushing 4, the bushing 4 can be press-fit into the cylindrical passage in the nozzle tip holder 5. The outside land 14 on the bushing 4 is thereby in tensive sealing engagement with the inner cylindrical surface 16 of the passage in the nozzle tip holder 5. When the bushing 4 is pressed into the tip holder 5, only a fraction of the forces exerted on the outside land 14 of the bushing 4 are transmitted to the nozzle tip 3 at the interface between the inside land 15 of the bushing 4 and the nozzle tip surface 7. The forces interract only indirectly through the intermediate portion of the bushing between the lands 14, 15; this intermediate portion being displaced from both lands 14, 15. Thus, the nozzle tip 3 is held and sealed into nozzle tip holder 5 by only mechanical interfaces, but without undue forces being applied to the nozzle tip 3.

The front of the tip holder 5 has a lip 17. This lip 17 serves to restrict any forward motion of the nozzle tip 3 or bushing 4 when the assembly is subjected to pressure. While the frictional forces between the lands 14, 15 and the surfaces 7, 16 of the tip holder 5 and tip 3 respectively are sufficient to hold the assembly together under most applications, if the system were subjected to a pressure for which the frictional forces could not hold the nozzle together, the lip 17 on the tip holder 5 would provide an additional safety margin for holding it without subjecting a perhaps brittle nozzle tip 3 to forces which might cause fracture.

After assembly, the nozzle tip 3, bushing 4, and nozzle tip holder 5 are secured to the end of conduit 2 by means of retaining nut 6 threadably secured to the conduit 2. This arrangement holds the passage through the nozzle tip in fluid communication with the fluid under pressure in the passage 2 of the conduit 1.

Figure 2:
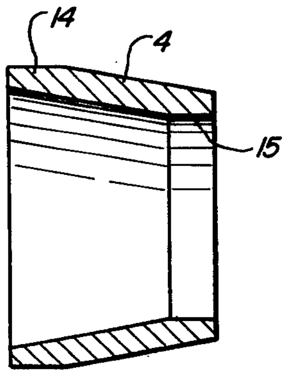
FIG. 2 is a cross sectional view of the bushing used in the nozzle of FIG. 1 by itself.
Figure 3:
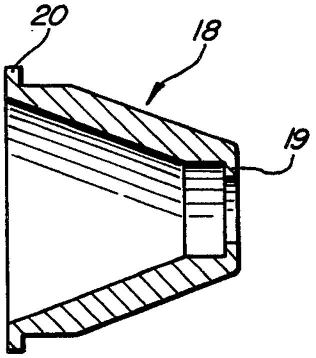
FIG. 3 is a cross sectional view of an alternate embodiment of the bushing shown in FIG. 2.
Figure 4:
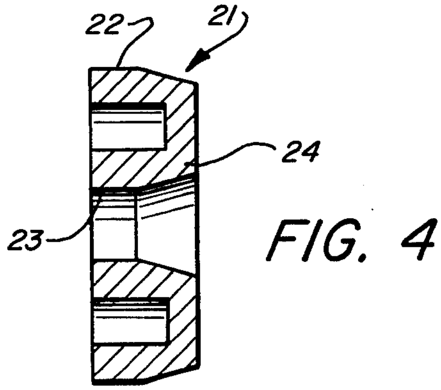
FIG. 4 is a cross sectional view of still another alternate embodiment of the bushing shown in FIG. 2.

FIGS. 3 and 4 merely show alternate embodiments of the bushing 4. The bushing 18 shown in FIG. 3 is identical to the bushing 4 shown in FIG. 2 except for a radially outward lip 20 at the larger end of the bushing 18 and a radially inward lip 19 at the smaller end of the bushing 18. This design would secure the tip 3 against forward movement caused by the pressurized fluid, but without need for the radially inward lip 17 on the holder 5. The radially inward lip 19 on the bushing 18 would overlap the front of the tip 3. An annular step would be provided at the rear surface of the tip holder 5 to receive the radially outward lip 20 of the bushing 18. When assembled, the lip 20 would engage the rearward surface of the annular step on the tip holder 5, and the front surface of the tip 3 would engage the rear surface of the radially inward lip 19 so as to prevent any forward motion of the tip 3 when the assembly is subjected to pressure.

FIG. 4 shows another embodiment of the bushing 4. The bushing 21 of FIG. 4 is in the shape of toroid generated by the revolution of a solid U-shaped surface about an axis extending generally in the direction of the open portion of the solid U. The bushing 21 has a continuous outside mating surface land 22 and continuous inside mating surface land 23. A joining portion 24 is displaced from the mating surfaces 22, 23. The sealing forces acting on the mating surfaces 22, 23 therefore, interract only indirectly through the joining portion 24 of the bushing 21. The bushing 21 of FIG. 4 could be used at higher pressure than the preferred bushing 4 of FIG. 2 because hydraulic pressure applied to the nozzle would tend to increase the sealing forces at both mating surfaces 22, 23. It may be noted that the construction and stresses in both alternate bushings 18, 21 shown in FIGS. 3 and 4 are more complicated than in the bushing 4 shown in FIG. 2. Therefore the bushing 4 shown in FIG. 2 is preferred.

Specific embodiments of the invention have been described above. It must be understood that numerous modifications would be possible to persons skilled in the art, without departing from the scope of this invention.

For example, the taper of the bushing 4 need not be linear. For example, a cross section through the wall parallel to the axis of the bushing might have an "S" shape.

The lip 17 on the tip holder 5 is desirable and had advantages in many applications, but is not essential to certain aspects of this invention. For example, when used in low pressure systems the frictional forces at the lands might suffice to hold the tip.

The passage in the nozzle tip holder 5 need not necessarily be of a perfectly cylindrical shape. Likewise, the outer side surface 7 of the nozzle tip 3 need not be of perfectly cylindrical shape. For example, the mating surfaces could each be angled.

Further, the amount of surface area contact of the mating surfaces of the elements could be increased or decreased.

The bushing 4 could be made of material other than stainless steel.

Having described my invention I claim:

1. A nozzle comprising:

a nozzle tip with a passage through it;

a nozzle tip holder with a hole in it, the holder being adapted to have the hole in hydraulically sealed communication with a source of fluid under pressure; and means tapered from a larger end to a smaller end supporting the tip in the hole of the holder through press-fit mating surface engagement between a circumferentially continuous outward surface of the supporting means at said larger end and a circumferentially continuous inward surface of the hole in the holder, and through press-fit mating surface engagement between a circumferentially continuous outward side surface of the tip and a circumferentially continuous inward surface of the supporting means at said smaller end, wherein the forces exerted by the supporting means at the mating surfaces interact only indirectly through a portion of the supporting means displaced from the mating surfaces.

2. A nozzle comprising:

a nozzle tip holder having a passage defined at least partially by a circumferential inward surface through it;

a nozzle tip having a passage through it defined at least partially by a circumferentially outward surface;

a one piece stiff resilient bushing like member tapered from a larger end to a smaller end having a thin walled portion proximate said larger end in press-fit continuous mating surface tensive sealing engagement with the circumferential inward surface of the passage through the holder, and another thin walled portion proximate said smaller end in press-fit continuous mating surface compressive sealing engagement with the circumferential outward surface of the tip, wherein the tensive and compressive forces exerted by the mating surfaces of said member interact only indirectly through a portion of said member which is displaced from the mating surfaces.

3. The nozzle of claim 2 which further comprises means to restrict movement of the nozzle tip in a direction which would tend to relieve hydraulic pressure during use.

4. The nozzle of claim 2 wherein the mating surfaces are generally cylindrical.

5. The nozzle of claim 4 which further comprises means to restrict movement of the nozzle tip in a direction which would tend to relieve hydraulic pressure during use.

6. A nozzle comprising:

a nozzle tip holder having a hole through it, the hole having cylindrical inward surface;

a nozzle tip with a fluid passage through it, having an outward cylindrical surface encircling the passage, said tip being disposed centrally of the hole in the nozzle tip holder;

a one piece stiff resilient thin walled bushing means supporting and hydraulically sealing the nozzle tip centrally of the hole in holder, being tapered from a larger end to a smaller end and having an outward surface at its larger end in press-fit continuous mating surface sealing engagement with the cylindrical inward surface of the hole in the holder, and the bushing having an inward surface at its smaller end in press-fit continuous mating surface sealing engagement with the outward cylindrical surface of the nozzle tip.

7. A nozzle comprising:

a nozzle tip having a fluid passage therethrough and a cylindrically shaped outer surface axially aligned with said passage;

a thin walled, generally frusto conically shaped bushing encircling the nozzle tip;

a nozzle tip holder having a passage therethrough at least partly defined by an inner cylindrical surface encircling the bushing and the nozzle tip;

said bushing being tapered from a diametrally larger end to a diametrally smaller end and having generally uniform wall thickness throughout; and further having a cylindrical inside land at the smaller end in press-fit sealing engagement with said cylindrically shaped outer surface of the nozzle tip, and a cylindrical outside land at the larger end in press-fit sealing engagement with said cylindrical surface partly defining the passage through the nozzle tip holder.

8. The nozzle of claim 7 which further comprises means connecting said nozzle tip to fluid under pressure.

* * * * *